United States Patent [19]

Trumble

[11] Patent Number: 4,784,877
[45] Date of Patent: Nov. 15, 1988

[54] TWO LAYER COATING OF AN OPTICAL WAVEGUIDE

[75] Inventor: William P. Trumble, Kanata, Canada

[73] Assignee: Northern Telecom Limited, Canada

[21] Appl. No.: 25,198

[22] Filed: Mar. 12, 1987

[30] Foreign Application Priority Data

Nov. 5, 1986 [CA] Canada .................................. 522264

[51] Int. Cl.$^4$ ........................ B05D 5/06; C23C 14/00; G02B 6/22; G02B 6/10
[52] U.S. Cl. .................................... 427/163; 427/164; 427/167; 204/192.14; 204/192.23; 204/192.26; 204/192.27; 204/192.31; 350/96.29; 350/96.3; 350/96.31; 350/96.33
[58] Field of Search ................. 350/96.29, 96.3, 96.31, 350/96.33; 29/600; 427/42, 163, 167, 164; 428/388, 412; 204/192.14, 192.23, 192.26, 192.27, 192.28, 192.31

[56] References Cited

U.S. PATENT DOCUMENTS

| | | | |
|---|---|---|---|
| 3,953,652 | 4/1976 | Addis, Jr. et al. ..................... | 427/42 |
| 4,039,248 | 8/1977 | Franke et al. ....................... | 350/96.3 |
| 4,052,520 | 10/1977 | Chang et al. ......................... | 427/167 |
| 4,139,262 | 2/1979 | Mahlein et al. ...................... | 350/96.3 |
| 4,422,719 | 12/1983 | Orcutt .................................. | 350/96.3 |
| 4,504,113 | 3/1985 | Baak .................................... | 350/96.33 |
| 4,530,750 | 7/1985 | Aisenberg ........................ | 204/192.26 |
| 4,593,974 | 6/1986 | Yamamoto et al. ................ | 428/394 |

OTHER PUBLICATIONS

J. Vac. Sci. Technol. A 1(2): 352–355 (1983); Brett et al.
J. Vac. Sci. Technol. A 3(3): 491–494 (1985); Rostworowski.
Applied Optics, 23(4): 552–559 (1984); McNeil et al.
2d Int'l Conf. Ion Plating & Allied Techniques 84; (C.E.T. Consultants Ltd., Edinburgh 1979); Hawson et al.

*Primary Examiner*—Norman Morgenstern
*Assistant Examiner*—Margaret Burke
*Attorney, Agent, or Firm*—Foley & Lardner, Schwartz, Jeffery, Schwaab, Mack, Blumenthal & Evans

[57] ABSTRACT

Optical conductors, useful in the transmission of data-encoding light beams, that comprise an optically transmissive rod carrying one or more cavities, each with a border defining an inclined planar surface, can be produced via a method comprising the steps of (1) coating the rod, via plasma-assisted physical vapor deposition, with an amorphous material of lower refractive index than the rod's; and (2) rendering each inclined planar surface light-reflective. The sequence of steps (1) and (2) can be reversed.

22 Claims, 1 Drawing Sheet

4,784,877

TWO LAYER COATING OF AN OPTICAL WAVEGUIDE

BACKGROUND OF THE INVENTION

The present invention relates to a method for fabricating an optical conductor which can be used for optically interconnecting electronic and/or photonic equipment. The present invention is particularly suitable for making a waveguide element that comprises an optically transmissive rod and at least one reflective surface which is inclined, respectively, relative to an external planar surface and the longitudinal axis of the rod.

The increasingly high transmission rates typical of present-day computer and telecommunications equipment have led to the use of optical conductors, also called waveguides, as the main conduits for data which may be transmitted at rates of a gigabit and more per second. In telecommunications equipment, waveguides have been used to interconnect circuit cards which are mounted perpendicularly to a backplane of the equipment. The optical interconnections provided by waveguides in such equipment have heretofore employed several optical fibers which extend from a light source to respective receivers. Alternatively, a single optical fiber has been coupled to the light source, and tappings have been made by splicing optical fibers at intervals along its length. The tappings convey light to the receivers.

As the number and complexity of the interconnections to be made by optical tappings increases, the difficulties encountered in producing and installing a waveguide that is based on optical fibers likewise multiply. Moreover, there is the problem of protecting such waveguides from physical defects which affect optical properties. Although it is convenient to make a waveguide of light-transmissive plastic, and while a bare plastic waveguide is functional, it has been deemed preferable to coat such a waveguide so as to reduce scratching and contamination, both of which cause leakage of light at the surface of the waveguide. A coating of this sort must have a refractive index lower than that of the plastic to ensure confinement of light within the waveguide.

If the coating were of plastic, applied by solution-coating, difficulties could be encountered from the solvent's attacking the plastic material of the waveguide. If electrostatic coating were used, with subsequent baking to fuse the plastic coating, that baking could cause distortion of the waveguide, with consequent disturbance of the optical path.

SUMMARY OF THE INVENTION

It is therefore an object of the present invention to provide a simple, relatively inexpensive method for manufacturing a waveguide element that can accommodate optical transmission along its length and, in addition, lateral reflection of portions of a longitudinally conducted light beam through an external planar surface of the waveguide, which method ensures the optical integrity of the waveguide.

In accomplishing this object, there has been provided, in accordance with the present invention, a method for making an optical waveguide element which comprises an optically transmissive rod having a predetermined cross-sectional area and comprising (A) an external planar surface extending along its length in parallel with the longitudinal axis of the rod and (B) at least one cavity having (1) a longitudinal axis which is transverse to the longitudinal axis of the rod and (2) a border in the rod which defines an inclined planar surface (ii). More specifically, the method provided by the present invention comprises the steps of (a) coating the rod by plasma-assisted physical vapor deposition with a layer comprised of an amorphous material having a refractive index that is lower than the refractive index of the rod; and (b) rendering at least surface the inclined planar light-reflective by corrugating it or coating it with a lightreflective material. In a preferred embodiment, the method of the present invention provides a waveguide element structured so that light traveling longitudinally in the element is reflected through the cross section of the element before passing through an external planar surface of the element.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The method of the present invention can be employed to advantage in the manufacture of any optical conductor comprising an optically transmissive medium, in rod form or similar configuration, into which reflective surfaces are incorporated at an incline relative to the longitudinal axis of the conductor. In accordance with the present invention, the above-described method is preferably used to make an optical conductor having the characteristics of a waveguide described in U.S. patent application Ser. No. 840,262 filed Mar. 17, 1986, the contents of which are hereby incorporated by reference.

Figure 1:
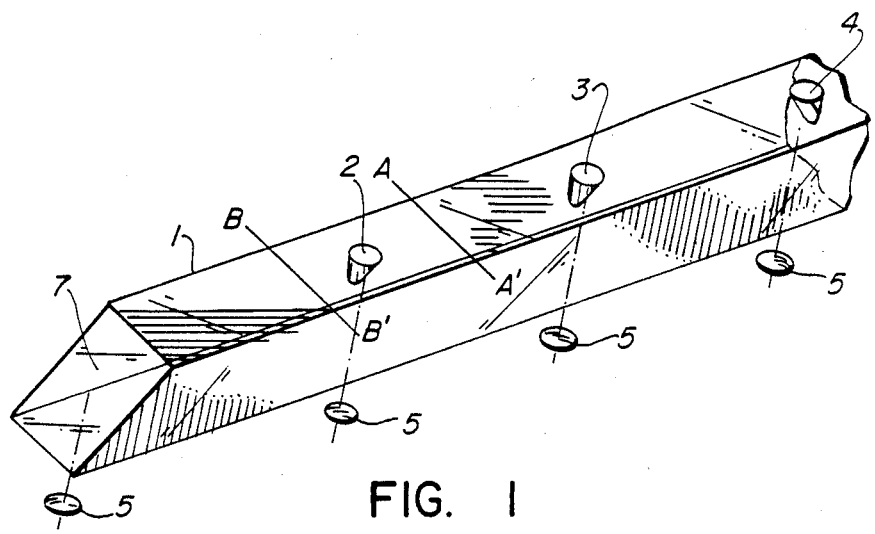
FIG. 1 is a schematic drawing providing a perspective view of an optical conductor produced in accordance with the present invention.

A typical waveguide produced using the present invention is shown in FIG. 1. The rod-like, optically transmissive component 1 preferably has a regular form and a polygonal, especially square, cross section, as shown. The polygonal form is preferred to a cylindrical one because the former does not produce cylindrical lens effects. A cylindrical form would cause the light beam to spread by different amounts in different, mutually perpendicular planes before arriving at an associated detector. A square cross section is especially advantageous since, when provided with additional, suitably positioned inclined surfaces, a conductor having a square cross section allows light beams to emerge or enter from four mutually perpendicular directions. But other rod shapes can be used, such as triangular, with the light reflectors being formed (as described below) by notching one apex so as to redirect light to emerge from an opposing facet in the rod.

Rod 1 can be any transmissive material, but is preferably a synthetic plastic material, particularly one which is transparent to the red light often used for optical data transmission. For ease of manufacture, a plastic material having a softening temperature of at least 60° C. is also preferred. A plastic suitable for use in the present invention can be selected from, among others, an aryl ester like ARDEL (Union Carbide), a polycarbonate such as CALIBRE (Dow Chemical) or LEXAN (General Electric), a polysulfone like UDEL (Union Carbide), a carbonate-ester plastic alloy such as XENOY (General Electric), and an aromatic ester carbonate copolymer, for example, AEC (Dow Chemical). Polycarbonate plastics are particularly preferred, not only because they are readily machined and have a high melting point but also because polycarbonates generally have high refractive indices. It is therefore easier to select for them a cladding material (applied as described below) which has a lower refractive index and, hence, can act as a waveguide for light conducted through plastic "optical fiber" represented by the rod.

Figure 2A:
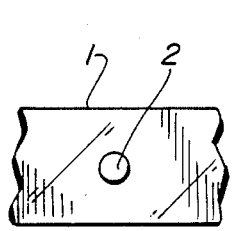
FIG. 2 incorporates schematic drawings providing, respectively, a plane (A), side elevation (B) and sectional (C) view of a segment of the optical conductor depicted in FIG. 1, which segment is defined by planes A—A'/B—B'.
Figure 2B:
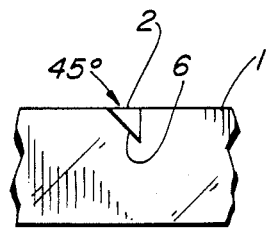
Figure 2C:
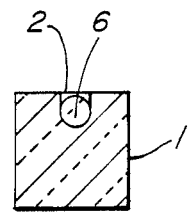

At least one cavity, and preferably a series of cavities 2, 3 and 4 in predetermined spaced relationship, are provided in rod 1, each cavity aligned with focusing means represented by a lens 5. (In practice, the focusing means would comprise other elements as described in copending U.S. application Ser. No. 840,262, cited above.) Each cavity is bordered by an inclined reflective surface 6, described in greater detail below; rod 1 also terminates with a reflective surface 7, Cavity formation in rod 1 can be accomplished during molding of the rod, when a solid preform having an external surface matching the configuration of the cavity can be inserted into the transmissive material prior to curing. To provide the preferred cavity configuration, as shown in FIG. 2, the preform would have an elliptical or circular cross section and, at the end inserted into the molding material, an inclined planar surface corresponding to an oblique truncation of the cavity created by insertion. A circular cross section is preferred because precision-tooled, small diameter circular rods are readily available commercially to use as solid preforms. In any event, the cavity thus formed should possess a longitudinal axis which is perpendicular to that of rod 1. The inclined planar surface preferably has an area that is on the order of 5%, preferably about 2% to 4%, of the cross-sectional area of the rod.

After the cavity or cavities have been provided in the lightconducting rod, the rod is coated with a layer of amorphous material having a refractive index that is lower than that of the transmissive material comprising the rod. Among the amorphous materials suitable for use in the present invention are those that are conventionally employed for optical coatings, such as silicon monoxide, silicon dioxide and other silicon oxides. Other amorphous substances, including aluminum oxide and magnesium fluoride, can be used so long as the selected material forms an adherent, continuous coating that does not absorb light transmitted through the rod.

Where the optical conductor rod is provided with a plurality of reflective surfaces for distributing light to emerge laterally of the conductor or, conversely, to aggregate light beams impinging laterally, the coating material may be applied without masking those surfaces. Thereafter, the reflective surface can be formed by applying a suitable material, such as gold, silver or aluminum, to the appropriate area, overlying the coating at that point. Alternatively, the area could be masked during the coating step and the reflective material applied directly to the exposed area of the rod once the masking has been removed.

Whether the reflector material is applied to the rod or to the coating, it may be necessary, or at last preferable, first to apply an adhesion layer. Where the reflective material is gold or silver, for example, the adhesion layer can be comprised of chromium or titanium.

There are several processes known to the art for applying amorphous material to a substrate, particularly a plastic substrate, any of which can be employed in coating rod 1. Particularly preferred are the variants of plasma-assisted physical vapor deposition (PAPVD) technology developed for producing integrated circuits. For example, reactive sputtering (RS) techniques for depositing silica ($SiO_2$) and other oxides, such as $Al_2O_3$, onto glass or plastic are suitable for use in the present invention. In an RS process, metal atoms are sputtered from a metallic target by positive ions from a plasma which typically comprises a reactive gas (in the present context, oxygen) and an inert gas like argon. The latter component of the plasma is added to dilute the reactive gas.

In RS, the vapor species of silicon, aluminum and the like are generated by momentum exchange between the positive (oxygen) ions bombarding the target and the atoms of the target. The sputtering rate is, therefore, totally dependent on the power input to the target from the plasma, i.e., the product of cathode voltage and current in the case of dc sputtering. Sputtering rate is thus plasma dependent. Sputtering apparatus tube incorporating a planar or biplanar magnetron, a Kaufman ion gun system or a whole-cathode magnetron, which can be used to coat rod 1 with amorphous material in accordance with the present invention, are disclosed by Brett et al, *J. Vac. Sci. Technol.* A 1(2): 352-55 (1983); Rostworowski, *J. Vac. Sci. Technol.* A 3(3): 491-94 (1985); and McNeil et al, *Applied Optics* 23(4): 552-59 (1984), the respective contents of which are hereby incorporated by reference.

Also suitable for use in applying the amorphous coating by PAPVD, according to the present invention, are techniques involving activated reactive evaporation (ARE). In an ARE process, metal atoms are produced from an evaporation source which may be heated by a thermionic electron beam, a plasma electron beam, resistance heating or arc heating. The gas phase is usually only the reactive gas at pressures less than $1 \times 10^{-3}$ Torr. The plasma is created in the source-substrate space by injecting low energy electrons (20-200 eV). The cross section for electron/molecular collisions goes through a maximum in this low energy range and decreases drastically at higher energies. The source of the low energy electrons can be a thermionically heated cathode or, when an electron beam is used for heating, the plasma sheath above the pool of molten metal which is formed on top of the evaporation source by the action of the electron beam. (An appropriately spaced anode biased to a low positive potential is also provided.) In addition, radio frequency excitation can be used to form the plasma. Since the vapor species are generated by thermal energy imparted to the target, the evaporation rate varies directly as the vapor pressure of the target element, which in turn is dependent on the temperature of the target surface. Conversely, the plasma has little or no influence on the evaporation rate. Unlike RS, therefore, an ARE process is plasma independent.

Although system parameters for deposition will be adjusted empirically to accommodate different rod geometries, vapor species and reactive-gas mixtures, typical ranges of operating conditions for depositing the coating of amorphous material according to the present invention, by both RS and ARE techniques, are given in Table I.

TABLE I

| Typical Deposition Conditions Used in ARE and RS Processes | | |
|---|---|---|
| Processes Variable | ARE | RS |
| Pressure | $10^{-3}$–$10^{-4}$ Torr | $10^{-2}$–$10^{-3}$ Torr |
| Source/substrate distance | 20–25 cm | 4–6 cm |
| Gases used | Reactive gas, such as $C_2H_2$, $N_2$, $O_2$ | Reactive gas + inert gas mixtures |
| Substrate potential with respect to plasma | A few volts | Depends on input power and pressure; generally a few hundred volts |

In both RS and ARE processes, substrate rod 1 will acquire a negative bias if it is immersed in the plasma, due to the "floating potential" phenomenon. Additionally, the substrate can be biased to a higher negative potential by connection to an Rf power supply. In ARE, the control parameters usually subject to empirical adjustment are the power of the electron beam and the minimum power in the glow discharge between source and substrate. In RS, on the other hand, the primary control parameters are reactive-gas flow rate and sputtering power. The former is largely dependent on the speed with which reactive gas is pumped into the system; flow rate is adjusted to achieve the desired operating pressure, with a rate in the range of 5 to 25 stand $cm^2$/min being typical. Sputtering power, expressed as total power to target, is a function of target size; a value of about 4 watts per $cm^2$ of target surface is illustrative.

In addition to ARE, the related technique of ion plating can also be used to apply a coating of amorphous coating to a lighttransmissive rod, pursuant to the present invention. In an ion-plating process, like ARE, an evaporation source is heated, for example, by induction heating, in an atmosphere containing a reactive gas (oxygen). Induction heating provides the advantage of operation at the residual atmosphere pressures of oxygen required for the reactive ion plating to occur. See Howson et al in 2d INT'L CONF. ION PLATING & ALLIED TECHNIQUES 84 (C.E.T. Consultants Ltd., Edinburgh 1979), the contents of which are hereby incorporated by reference. Magnetron sputtering can also be used in the production of sputtered species, with the advantage of only a small heating effect on the rod substrate. Id. In any event, ion plating differs from ARE in that the substrate is biased with respect to the plasma to a potential on the order of kilovolts, rather than only a few volts as in ARE.

For example, a layer of amorphous silicon oxide material can be applied to a plastic, optically transmissive rod, as described above, by evaporating SiO as a powder charge from a tantalum "boat," which is heated resistively in a conventional evaporator device (voltage ~10 kV) by the passage of current. The resulting source temperature would be adjusted to about 1025° C., typically resulting in a deposition rate in the range of 4 nm/s. To increase the oxygen content of the applied film, thereby assuring an $SiO_x$ constituency that is closer to $SiO_2$, an oxygen atmosphere can be maintained in the evaporator, at a pressure of about 10 mTorr, and a discharge initiated therein (via DC or Rf power) to increase $O_2$ reactivity.

Either before or after rod 1 is subjected to a coating treatment as described above, at least the inclined planar surface 6 that forms a border of the cavity in the rod (see, e.g., FIG. 2B) is coated with a reflective material. More specifically, the inclined planar surface 6 in each cavity 2-4 of rod 1 is coated in such a way that the surface acts as a mirror with regard to light conducted longitudinally through the rod. Reflective, noncorroding metals are preferred as materials to be deposited, for example, by a conventional sputtering process, onto the inclined planar surfaces. Gold, silver, aluminum, copper and nickel are particularly suitable in this regard.

In an illustrative operation, gold or some other reflective metal is evaporated by electron beam evaporation from a gold charge in a water-cooled copper hearth. Thus, with an electron-beam power in the range of 3 kW, the deposition rate on a substrate (which itself is not heated) at a distance of 35 cm from a gold source would be about 8 nm/s or less. Prior to evaporation of the reflective material, an adhesion layer would usually be applied, as mentioned above, using the same evaporation cycle and apparatus, but with a charge of the adhesion material, such as Ti or Cr, provided in the copper hearth. Typical electron-beam power values and deposition rates would be roughly 0.9 kW and 5.0 nm/s for Ti, and 1.2 kW and 6 nm/s for Cr. An adhesion-layer thickness of about 20 nm is usually suitable.

In one preferred embodiment of the present invention, the planar surface coated with reflective material is itself substantially free of any amorphous material with which the transmissive rod is coated. In this embodiment, for example, when the method of the present invention comprises coating the rod with amorphous material before a reflective material is deposited on the planar surface, then the inclined planar surface can be masked during the first coating step. Thereafter, the surface regions of the rod that are coated with amorphous material can be masked and the inclined planar surface, now unmasked, coated with the reflective material; that is, only the planar surface is rendered reflective. Alternatively, the amorphous material-coated rod surfaces need not be masked, resulting in the depositing of reflective material over the entire rod, as well as on the inclined planar surface of each cavity.

Figure 3:
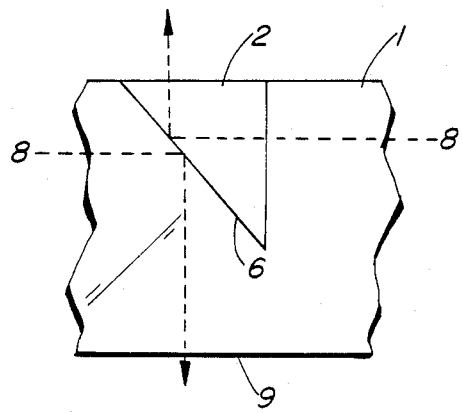
FIG. 3 is a drawing that provides a side elevation view of a portion of an optical conductor produced with the present invention, in particular depicting the different reflection paths for light passing through the optical conductor.

In another preferred embodiment, both the external surfaces of the rod and the inclined planar surface of the cavities are coated with amorphous material, and then are overcoated (or only the inclined planar surface is overcoated) with reflective material. In yet another preferred embodiment of the present invention, the step of depositing reflective material on each inclined planar surface (and, optionally, over the exposed surfaces of the transmissive rod) precedes the amorphous material-coating step. In this embodiment, it is also preferable that a region of the rod surface, opposite each planar surface along a line that a light beam 8 transmitted down the rod would follow if reflected from the planar surface (see FIG. 3), should be masked during the first coating step, thereby leaving it nonreflective. The same region can remain masked when the other rod surfaces are thereafter coated with amorphous material. In this way, the rod surface region 9 directly opposite a given reflective planar surface can be free of any coating, or can be coated with a light-transmissive material only, permitting light reflected through the cross section of the rod from the inclined planar surface to exit the rod laterally with a minimum of distortion.

What is claimed is:

1. A method for making an optical waveguide element which comprises an optically transmissive rod compound of at least one selected from the group consisting of aryl esters, polycarbonates, polysulfones, carbonates-esters plastic alloys and aromatic ester carbonate copolymers having a predetermined cross sectional area and comprising (A) an external planar surface extending along its length in parallel with the longitudinal axis of said rod and (B) at least one cavity having (1) a longitudinal axis which is transverse to said longitudinal axis of said rod and (2) a border in said rod which defines an inclined planar surface, said method comprising the steps of
   (a) coating said rod by plasma-assisted physical vapor deposition with a layer comprised of an unfused silicon oxide material having a refractive index that is lower than the refractive index of said rod; and
   (b) rendering at least said inclined planar surface light-reflective by corrugating said inclined planar surface or coating said inclined planar surface with a light-reflective material.

2. A method according to claim 1, wherein said lightreflective material is selected from gold, silver, aluminum, copper and nickel.

3. A method according to claim 1, wherein said inclined planar surface has an area which is no more than about 5% of said cross-sectional area of said rod.

4. A method according to claim 1, wherein said rod is comprised of plastics material which is transmissive to red light.

5. A method according to claim 1, wherein step (a) comprises depositing said amorphous material by reactive sputtering.

6. A method according to claim 5, wherein said reactive sputtering is a magnetron sputtering process.

7. A method according to claim 1, wherein step (a) comprises depositing said amorphous material by activated reactive evaporation.

8. A method according to claim 7, wherein said activated reactive evaporation is an ion-plating process.

9. A method according to claim 1, wherein said rod has a regular-polygonal cross section.

10. A method according to claim 9, wherein said rod has a square cross section.

11. A method according to claim 1, wherein said cavity has a circular cross section.

12. A method according to claim 1, wherein step (b) comprises corrugating said inclined planar surface.

13. A method according to claim 1, wherein step (b) comprises coating said inclined planar surface with a light-reflective material.

14. A method according to claim 1, further comprising the step of providing an adhesion layer intermediate between said rod and said reflective material.

15. A method according to claim 13, wherein step (b) comprises coating only said inclined planar surface with said light-reflective material.

16. A method according to claim 15, wherein step (a) comprises coating said rod such that said inclined planar surface is substantially free of said amorphous material.

17. A method according to claim 16, wherein step (a) precedes step (b).

18. A method according to claim 17, wherein said lightreflective material is selected from gold and silver.

19. A method according to claim 18, further comprising the step of providing an adhesion layer intermediate between said rod and said reflective material.

20. A method according to claim 19, wherein said adhesion layer is comprised of chromium or titanium.

21. A method according to claim 13, wherein step (b) precedes step (a) and further comprises coating said rod with said lightreflective material such that a surface region of said rod which is opposite said inclined planar surface along a transverse line through the cross section of said rod is not coated with said light-reflective material.

22. A method according to claim 21, wherein:
   step (a) further comprises coating all surfaces of said cavity with said amorphous material; and
   said rod is coated during step (a) such that a surface region of said rod which is opposite said inclined planar surface along a transverse line through the cross section of said rod is not coated wtih amorphous material.

* * * * *